United States Patent [19]
Hasebe et al.

[11] Patent Number: 5,286,473
[45] Date of Patent: Feb. 15, 1994

[54] PROCESS FOR THE PRODUCTION OF HYDROGEN

[76] Inventors: Nobuyasu Hasebe; Nobukatsu Hasebe, both of 30351 Camino Porvenir, Rancho Palos Verdes, Calif. 90274

[21] Appl. No.: 11,740

[22] Filed: Feb. 1, 1993

[51] Int. Cl.$^5$ ................................................ C01B 3/08
[52] U.S. Cl. ..................................... 423/657; 423/495
[58] Field of Search .................................. 423/657, 495

[56] References Cited

U.S. PATENT DOCUMENTS

| | | | |
|---|---|---|---|
| 909,536 | 1/1909 | Brindley | 423/657 |
| 3,490,871 | 1/1970 | Miller et al. | 423/657 |
| 3,585,007 | 6/1971 | Gross | 423/657 |
| 3,729,548 | 4/1973 | Lemke | 423/657 |
| 3,832,452 | 8/1974 | Crouch, Jr. | 423/495 |
| 4,356,163 | 10/1982 | Davidson | 423/657 |
| 4,358,291 | 11/1982 | Cuomo et al. | 423/657 |
| 4,842,844 | 6/1989 | Harris et al. | 423/657 |

FOREIGN PATENT DOCUMENTS

| | | | |
|---|---|---|---|
| 75688 | 6/1977 | Japan | 423/657 |
| 188401 | 11/1982 | Japan | 423/657 |

*Primary Examiner*—Wayne Langel
*Attorney, Agent, or Firm*—John E. Vanderburgh

[57] ABSTRACT

In accordance with the invention an alkali metal is reacted with an ionizable hydrogen compound selected from the group consisting of hydrochloric acid, water or mixtures thereof to produce hydrogen and an alkali metal chloride or alkali metal hydroxide, depending upon whether hydrochloric acid or water is used to react with the alkali metal. The alkali metal chloride produced directly as a by-product of the hydrogen production step, or subsequently from the alkali metal hydroxide, is heated in the presence of aluminum to produce the alkali metal for reuse in the process and aluminum chloride. The aluminum chloride is hydrolyzed to aluminum hydroxide and hydrochloric acid. The hydrochloric acid can be recycled to produce hydrogen by reaction directly with the alkali metal or can be used to convert the alkali metal hydroxide formed during the hydrogen production step to the alkali metal chloride which can be recycled back into the process. The aluminum hydroxide thus formed can be electrolyzed to aluminum metal and water to provide a method of recovering aluminum metal from aluminum scrap which previously has not be readily recyclable.

18 Claims, No Drawings

PROCESS FOR THE PRODUCTION OF HYDROGEN

FIELD OF THE INVENTION

This invention relates to a process for the production of non-fossil fuels and more particularly to a method for the production of hydrogen in which aluminum metal can be recovered as a by-product of the method.

BACKGROUND OF THE INVENTION

With the increasing concern over global warming due to the greenhouse effect, various energy sources are being considered to replace fossil fuels. One of these energy sources is hydrogen. However, hydrogen is highly reactive and presents serious storage problems.

A process in which the hydrogen is continually formed, much in the same manner as the production of electricity, would eliminate the storage problems. In this regard some researchers have suggested large scale electrolysis of water with the electricity required for the process being produced from solar power. However, such a method would require a substantial amount of electrical energy and a large scale solar electrical producing plant. Such a plant for producing hydrogen would be expensive to construct and would undoubtedly produce sufficient electrical energy for use directly thus eliminating the need for the additional step of water hydrolysis for the production of hydrogen. A n o t h e r suggestion to eliminate the hydrogen storage problem would be to utilize a hydrogen absorbing sponge metal. The hydrogen would then be stored in the sponge metal and would be subsequently released when needed. This storage method also poses problems with regard to the release of the hydrogen from the sponge metal and also in the expense of preparing and transporting the sponge metal to a location where the hydrogen is to be utilized.

It is highly desirable therefore to provide an efficient, low cost method for producing hydrogen utilizing relatively inexpensive reaction products on an as needed or continuous basis without the necessity of a storage facility.

SUMMARY OF THE INVENTION

The present invention provides a safe and efficient method for the production of hydrogen using readily available reaction products in which the hydrogen is produced on an as needed basis so that hydrogen storage is not necessary. It should be understood, however, that hydrogen may be produced in accordance with this invention for storage, if desired. The reaction by-products can be reused in the process thus increasing the efficiency and minimizing the cost of hydrogen production and producing substantially no environmentally harmful waste by-products. As an additional feature of the present invention, aluminum is utilized in the process for producing hydrogen. The aluminum may be in substantially any form and aluminum scrap, including in aluminum in forms currently not recyclable, such as aluminum alloys, may be employed as the source of aluminum and aluminum metal is recovered as a useful by-product.

In accordance with the invention an alkali metal is reacted with an ionizable hydrogen compound selected from the group consisting of hydrochloric acid, water or mixtures thereof to produce hydrogen and an alkali metal chloride or alkali metal hydroxide, depending upon whether hydrochloric acid or water is used to react with the alkali metal. In the preferred embodiment of the invention, the alkali metal is molded into a shape, such as a cylinder, which can be stored until ready for use. The dimensions of the cylinder control the rate at which the hydrogen is produced so that hydrogen can be continuously produced or produced on an as needed basis and the need for storing hydrogen can be eliminated.

The alkali metal chloride produced directly as a by-product of the hydrogen production step, or indirectly from the alkali metal hydroxide, is heated in the presence of aluminum to produce the alkali metal for reuse in the process and aluminum chloride. This reaction is carried out at a temperature above the sublimation temperature of the aluminum chloride. It is highly preferred to carry out this step of the process in an inert atmosphere to prevent the reaction of the alkali metal with atmospheric nitrogen or oxygen. The alkali metal oxides and nitrides are non-reactive in the process and result in the loss of the alkali metal from the process. Lithium, in particular, reacts directly with nitrogen to form lithium nitride. Lithium nitride does not react in this process for the recovery of the lithium and thus the lithium combined with nitrogen becomes a waste by-product and is lost.

The aluminum chloride is hydrolyzed to aluminum hydroxide and three moles of hydrochloric acid. The hydrochloric acid can be recycled to produce hydrogen by reaction directly with the alkali metal or can be used to convert the alkali metal hydroxide formed during the hydrogen production step to the alkali metal chloride which can be recycled back into the process. The aluminum hydroxide thus formed can be electrolyzed to aluminum metal and water to provide a method of recovering aluminum metal from aluminum scrap which previously has not be readily recyclable.

Any of the alkali metals, sodium, potassium or lithium can be employed as the alkali metal in the hydrogen production method of this invention. The alkali metals can be mixed to achieve greater control over the reaction kinetics since each alkali metal reacts at a different rate. Lithium is preferred, however, because it's rate of reaction with water is the least violent of the alkali metal group and is thus more easily controlled.

In addition to the advantages and features pointed out above, other advantages and features will become apparent from the following detailed description.

DETAILED DESCRIPTION OF THE INVENTION

The invention will be described hereinafter in connection with the use of the alkali metal lithium to produce hydrogen in accordance with one of the following reactions:

$$2Li + 2HCl \rightarrow 2LiCl + H_2 \tag{1}$$

$$2Li + 2H_2O \rightarrow 2LiOH + H_2 \tag{2}$$

Lithium is the preferred alkali metal for use in the present invention because it reacts less violently with the water and can be more readily controlled with fewer safety precautions during the hydrogen production step. It will be understood, however, that sodium and potassium are equally useful in the present invention although greater care must be taken to control the reaction between alkali metals and water.

In a preferred form of the invention, the lithium metal is formed into any shape by molding the molten metal or by the application of mechanical pressure to the metal powder. The selection of the shape into which the lithium metal is formed depends upon the desired rate of hydrogen production and the constraints of the physical environment in which the hydrogen production is carried out.

The cylindrical or the spherical shapes are preferred since such shapes provide the maximum surface area of the shape for reaction with the water or the hydrochloric acid. The lithium shape can be covered with a suitable moisture resistance material, such as for example a plastic sheet, to prevent the contact of moisture with the surface of the lithium cylinder or sphere. In this form the cylinders or spheres can be stored until ready for use. During use the moisture impervious material is removed from the cylinder or sphere and it is immersed directly into the water or hydrochloric acid for the hydrogen production step. The amount of lithium in contact with the water or the hydrochloric acid and the resultant amount of hydrogen thus produced is dependant on the dimensions of the cylinder or sphere and the surface area exposed to the reaction liquid. The rate and amount of hydrogen produced in this manner is essentially constant and decreases only gradually as the surface area of the cylinder or sphere decreases as lithium is consumed from the surface of the lithium shape. Accordingly hydrogen is produced at a constant rate and on an as needed basis which essentially eliminates the necessity for hydrogen storage, which is costly and dangerous.

In a next step, the lithium chloride produced in (1) above is reacted with aluminum to produce lithium and aluminum chloride in accordance with the following reaction:

$$3LiCl + Al \rightarrow 3Li + AlCl_3 \tag{3}$$

The reaction between lithium chloride and aluminum is carried out at a temperature above the sublimation temperature of 177.8° C. of aluminum chloride. Preferably the reaction is carried out at temperatures of between about 300° C. to about 950° C. as the higher temperature increases the rate of the reaction and insures that the lithium is in a molten state as produced so that it can be readily cast into a desired shape, such as a cylinder or a sphere. After cooling, the solid lithium obtained is recycled in the process to produce hydrogen in accordance with reactions (1) or (2). Where desired, the reaction temperature can be reduced by introducing potassium along with the lithium metal. The resulting chlorides have a lower point.

Where reaction (2) has been employed in the hydrogen production step, the lithium hydroxide is treated with hydrochloric acid to form lithium chloride for the lithium recovery in accordance with the following reaction:

$$LiOH + HCl \rightarrow LiCl + H_2O \tag{4}$$

The water in which the lithium is immersed will contain gradually increasing concentrations of lithium hydroxide. The conversion of the lithium hydroxide to lithium chloride can be accomplished as a batch operation when the lithium cylinder or sphere is exhausted. Alternately, portions of the water from reaction chamber may be drawn off and fresh makeup water added without interrupting the hydrogen production process. Hydrochloric acid may then be added to the lithium hydroxide containing water to form the lithium chloride according to reaction (4) above. The lithium chloride, which is highly soluble (45.85wt % at 25° C.) is separated from the water by evaporation. The lithium chloride is then combined with aluminum and heated above the sublimation temperature of aluminum chloride to form solid lithium and sublimed aluminum chloride in accordance with reaction (3). The solid lithium thus produced is cast into a cylindrical shape as described above for reuse in the process in the production of hydrogen.

The sublimated aluminum chloride is brought into contact with water, preferably in the form of steam, to hydrolyze the aluminum chloride to aluminum hydroxide with the production of hydrochloric acid in accordance with the following reaction:

$$AlCl_3 + 3H_2O \rightarrow Al(OH)_3 + 3HCl \tag{5}$$

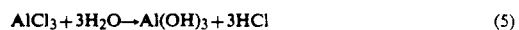

Reaction (5) is a highly exothermic reaction and the heat thus produced is utilized to form the steam used in the reaction.

The aluminum hydroxide is electrolyzed by conventional means not within the scope of the present invention to recover pure aluminum. The hydrochloric acid is recovered for use in reaction (4) to form lithium chloride from lithium hydroxide or can be used in the hydrogen production step according to reaction (1).

The aluminum utilized in reaction (3) may come from any aluminum containing source. A particularly desirable source of aluminum is aluminum scrap that is not normally recycled, such as for example aluminum foil and industrial products consisting largely of aluminum alloys. Thus in addition to an economical method for production of an alternate non-polluting fuel, the present invention provides a method for expanding the recyclability of aluminum scrap for the recovery of aluminum metal therefrom.

It is highly preferred that reaction (3) be carried out in an inert atmosphere to insure maximum recovery of the alkali metal from the reaction between the alkali metal chloride and the aluminum. This especially the case for lithium which reacts directly with nitrogen to form lithium nitride from which lithium is not recovered. The alkali metals will also react with oxygen, if present, which will produce compounds which are non-reactive in the process of the invention and which results in the loss of alkali metal.

Helium and hydrogen are the preferred gases used to form the inert atmosphere with helium being the most preferred since it is easiest to handle, even at the elevated reaction temperatures at which reaction (3) is carried out. When using hydrogen as the inert atmosphere great care must be taken to insure that oxygen does not leak into the container in which the reaction is being carried out to avoid any possibility of an explosion.

As mentioned, the sublimation step is preferably carried out at high temperatures. The most desirable and economical way to carry out the sublimation step with aluminum to produce lithium is to heat the mixture of lithium chloride and aluminum utilizing solar energy. Good results have been achieved by heating the mixture of lithium chloride and aluminum in a beam of solar radiation which has been focused by a reflective mirror or condensing lens. Focusing sunlight in this manner generates sufficient heat to sublimate the aluminum chloride thus formed at temperatures as high as 950° C.

Lithium metal is economically obtained by reacting hydrochloric acid with lithium pegmatite ores, such as spodumene ($LiAlSi_2O_6$), lepidolite or ambligonite ($LiAlFPO_4$) where such ores are readily assessable. The lithium is extracted from the ores in the form of lithium chloride which is them reacted with the aluminum in accordance with reaction (3) to form lithium metal.

The following examples are for the purpose of illustrating preferred methods of the present invention and not to be construed as limiting the scope of the invention.

EXAMPLE 1

A twelve gram sample of lithium chloride was mixed with 2.55 grams of aluminum powder and the mixture was heated in a gas fueled furnace to a temperature of about 340° C. under a helium atmosphere for thirty minutes. After cooling to room temperature, the resulting powder was removed from the furnace and reacted with water. About 3.11 liters of hydrogen was obtained and the yield of hydrogen was 98.1 percent.

EXAMPLE 2

A ten gram sample of sodium chloride was mixed with 1.54 grams of aluminum powder and the mixture was heated in a gas furnace to about 900° C. in a helium atmosphere. After thirty minutes at that temperature molten sodium was removed from the furnace and cast in a refractory mold into cylinders having a diameter of 11 mm and a length of 30 mm. After cooling the cylinders were reacted with water. About 1.87 liters of hydrogen was obtained per cylinder and the yield of hydrogen was 97.5 percent.

EXAMPLE 3

A ten gram sample of lithium chloride was mixed with 2.16 grams of aluminum powder and the mixture was heated up to about 950° C. in a helium atmosphere for 6 minutes by solar radiation. A condensing lens was used to focus a beam of solar radiation onto a refractory container holding the reaction mixture. Molten lithium obtained was transferred to the mold and cooled to form cylinders as in Example 2. After cooling the cylinder was reacted with water. About 2.59 liter of hydrogen per cylinder was obtained and the yield of hydrogen was 98.0 percent.

EXAMPLE 4

A 5 gram sample of sodium chloride was mixed with 0.77 grams of aluminum powder and the mixture was heated for 10 minutes to about 950° C. under a helium atmosphere using the condensing lens and refractory container of Example 3. The molten sodium obtained was transferred to the refractory mold and cooled into cylindrical shapes as in Example 2. After cooling the cylinders were reacted with water. About 0.93 liters of hydrogen per cylinder was obtained the yield hydrogen was 97.1 percent.

EXAMPLE 5

A five gram sample of potassium chloride was mixed 0.77 grams aluminum powder and the mixture was heated for 5 minutes to about 950° C. under a helium atmosphere using the condensing lens and refractory container of Example 3. The molten potassium obtained was placed in the refractory mold and cooled to form cylinders as in Example 2. After cooling the cylinders were reacted with water. About 0.73 liters of hydrogen per cylinder was obtained and the yield was 97.2 percent.

The method of the present invention has applications in industry and transportation. A cylinder of lithium 11 millimeters in diameter and 30 millimeters in length is capable of producing approximately 2.5 $Nm^3$ of hydrogen and 12 of the bars are capable of producing about 30 $Nm^3$ of hydrogen. A rough caloric estimate shows that this amount of hydrogen is equivalent to 2.6 gallons of gasoline.

The hydrogen obtained may be utilized directly in a hydrogen fueled engine or may be utilized to drive hydrogen-oxygen fuel cells for the production of electrical energy. Electrical energy can then be supplied to drive electric motor for pollution free translation into mechanical energy. In addition the method of the present invention provides an excellent way of utilizing aluminum scrap which is not readily recyclable and for ultimately obtaining aluminum metal from such scrap.

While the invention has been described above in connection with certain preferred embodiments, it will be understood that various arrangements other than those described in detail in the specification will occur to persons skilled in the art which arrangements lie within the spirit and scope of the invention.

It is therefore that it be understood that the invention is to be limited only by the claims appended hereto.

Having described the invention we claim;

1. A method for the production of hydrogen using recyclable reaction products, said method comprising the steps of:
    contacting an alkali metal with an ionizable hydrogen containing compound selected from the group consisting of hydrochloric acid, water and mixtures thereof thereby to produce hydrogen; forming the chloride of said alkali metal after contact
    with said ionizable hydrogen containing compound;
    heating said alkali metal chloride in the presence of aluminum to a reaction temperature above the sublimation temperature of aluminum chloride to form
    said alkali metal and aluminum chloride; and recovering said alkali metal for reuse in said process.

2. The method of claim 1 wherein said ionizable hydrogen containing compound is hydrochloric acid.

3. The method of claim 2 wherein said alkali metal is contacted with said hydrochloric acid to produce hydrogen according to the reaction;

$$2Alk + 2HCl \rightarrow 2AlkCl + H_2$$

wherein Alk is an alkali metal.

4. The method of claim 1 wherein said ionizable hydrogen containing compound is water.

5. The method of claim 4 wherein said alkali metal is contacted with said water to produce hydrogen according to the reaction;

$$2Alk + 2H_2O \rightarrow 2AlkOH + H_2$$

wherein Alk is an alkali metal.

6. The method of claim 1 further including the step of hydrolyzing said aluminum chloride by contact with water to form aluminum hydroxide and hydrochloric acid and recovering said hydrochloric acid.

7. The method of claim 6 wherein said hydrochloric acid is recycled for contact with said alkali metal to produce hydrogen according to the reaction:

2Alk+2HCl→2AlkCl+H₂ wherein Alk is an alkali metal.

8. The method of claim 6 wherein said hydrochloric acid is recycled for reaction with an alkali metal hydroxide to produce an alkali metal chloride according to the reaction:

AlkOH+HCl→AlkCl+H₂O wherein Alk is an alkali metal.

9. The method of claim 6 wherein said aluminum hydroxide is electrolyzed to recover aluminum metal.

10. The method of claim 1 wherein said reaction temperature is between 177.8° C. and 950° C.

11. The method of claim 1 wherein said reaction temperature is between about 300° C. and about 950° C.

12. The method of claim 1 wherein said alkali metal chloride and said aluminum are heated in an inert atmosphere.

13. The method of claim 12 wherein said inert atmosphere is helium.

14. The method of claim 12 wherein said inert atmosphere is hydrogen.

15. The method of claim 1 wherein said alkali metal chloride and said aluminum are heated by solar radiation.

16. The method of claim 1 wherein said alkali metal is selected from the group consisting of sodium, potassium, lithium and mixtures thereof.

17. The method of claim 1 wherein said alkali metal is formed as a cylinder.

18. The method of claim 1 wherein said alkali metal is formed as a sphere.

* * * * *